(12) United States Patent
Chang et al.

(10) Patent No.: US 7,893,622 B2
(45) Date of Patent: Feb. 22, 2011

(54) CIRCUIT APPARATUS OF LED VEHICLE LAMP

(75) Inventors: Abram Chang, Taipei (TW); Shih-Jen Chuang, Taoyuan Hsien (TW)

(73) Assignee: Everlight Electronics Co., Ltd., Taipei Hsien (TW)

( * ) Notice: Subject to any disclaimer, the term of this patent is extended or adjusted under 35 U.S.C. 154(b) by 440 days.

(21) Appl. No.: 12/046,895

(22) Filed: Mar. 12, 2008

(65) Prior Publication Data
US 2009/0135618 A1 May 28, 2009

(30) Foreign Application Priority Data
Nov. 22, 2007 (TW) .............................. 96219771 U

(51) Int. Cl.
*H05B 37/00* (2006.01)

(52) U.S. Cl. .................. 315/77; 315/82; 315/200 R; 315/312

(58) Field of Classification Search ............ 315/77, 315/82, 185 S, 200 A, 200 R, 291, 312; 362/464, 362/487, 545, 800; 307/10.1, 10.8
See application file for complete search history.

(56) References Cited

U.S. PATENT DOCUMENTS

| | | | | |
|---|---|---|---|---|
| 6,989,635 | B2 * | 1/2006 | Iwaki et al. | 315/82 |
| 7,274,150 | B2 * | 9/2007 | Takeda et al. | 315/77 |
| 2002/0043943 | A1 * | 4/2002 | Menzer et al. | 315/291 |
| 2003/0025465 | A1 * | 2/2003 | Swanson et al. | 315/291 |
| 2003/0067787 | A1 * | 4/2003 | Serizawa | 362/545 |
| 2007/0120507 | A1 * | 5/2007 | Uchida et al. | 315/360 |
| 2007/0132407 | A1 * | 6/2007 | Namba et al. | 315/312 |

\* cited by examiner

*Primary Examiner*—Douglas W Owens
*Assistant Examiner*—Tung X Le
(74) *Attorney, Agent, or Firm*—Muncy, Geissler, Olds & Lowe, PLLC

(57) ABSTRACT

A circuit apparatus of an LED vehicle lamp is disclosed. The circuit apparatus includes an input unit, an LED unit and a current limiting unit. The LED unit includes at least one light-emitting device. Each light-emitting device includes at least one LED and a protection device. The protection device and each one LED are connected in parallel. The circuit apparatus of an LED vehicle lamp protects the element of the LEDs from being damaged, increases traveling safety and simplifies maintenance.

14 Claims, 3 Drawing Sheets ial Number 96219771, filed Nov. 22, 2007, which is herein
CIRCUIT APPARATUS OF LED VEHICLE LAMP

RELATED APPLICATIONS

This application claims priority to Taiwan Application Serial Number 96219771, filed Nov. 22, 2007, which is herein incorporated by reference.

BACKGROUND

1. Field of Invention

The present invention relates to a circuit apparatus of a vehicle lamp. More particularly, the present invention relates to a circuit apparatus for a vehicle lamp adopting light emitting diodes (LEDs).

2. Description of Related Art

Due to the breakthrough in semiconductor manufacturing technology, light emitting diodes (LEDs) have been developed for lighting applications. LEDs have also become a major light source and have started to replace more traditional light sources. Additionally, LEDs have the advantages of low power consumption, long lifetime, small size and fast response. Therefore, LEDs have become an important lighting component in the next generation of light sources.

According to the evolution of automotive technology, LEDs have been extensively used in vehicles. LEDs are used as brake lights, indicator lights, dashboard lights and a dome light to replace traditional light bulbs, i.e. halogen bulbs or incandescent light bulb.

Moreover, a traditional circuit apparatus of a vehicle lamp comprises LED components that are directly connected to each other in series in advance, and then are connected in parallel. The circuit apparatus does not have any protection device. Once one of the LED components in the circuit apparatus is broken, the other LED connected in series in the same path will not work because of the aforementioned series-parallel connections. This not only influences the traveling safety but also makes maintenance and inspection of the LED circuit apparatus more difficult. Moreover, LED components are easily damaged by electrostatic discharge. The traditional circuit apparatus does not prevent this situation from occurring, thus it is necessary to provide a circuit apparatus of a vehicle lamp.

SUMMARY

An object of the present invention is to provide a circuit apparatus of an LED vehicle lamp to solve the aforementioned problems.

A circuit apparatus of an LED vehicle lamp in accordance with the present invention includes an input unit, an LED device and a current limiting unit. The LED unit includes at least one light-emitting device. Each light-emitting device includes at least one LED and a protection device. The protection device is connected to the LED in parallel.

The input unit receives various input signals, provides reverse bias protection and distinguishes input signals to make the light emitting device of the LED unit shine at different brightness levels depending on the different input signals. The protection device of the light-emitting device is constructed with two electrostatic discharge diodes connected in series back-to-back to enhance anti-electrostatic measures.

The current limiting unit is connected to the light-emitting device for limiting the total current value of the circuit. The current limiting unit restricts the total current value of the circuit and prevents it from being too high so as to prevent the LEDs from being broken. The current limiting unit has a reference signal terminal used as a reference potential for input signals. The protection device prevents the brightness of a vehicle lamp from declining substantially caused by the broken LEDs to increase the traveling safety. Additionally, when the LEDs are broken, it is easy to gauge which one is broken. Thus, the difficulty in repairing and maintaining is becoming easy and convenient.

According to the embodiment aforementioned, the advantages are summarized as below.

1. Each LED is connected to one protection device in parallel. When a single LED is broken, the circuit apparatus still works to prevent causing the brightness of the vehicle lamp from declining by a significant amount and thereby influences traveling safety.

2. The protection device uses an electrostatic discharge diode to enhance anti-electrostatic measure, and protects the whole circuit apparatus at the same time.

3. When one or more LEDs are broken, determining the faulty LED or failed circuit component is easy, and is quickly repaired.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
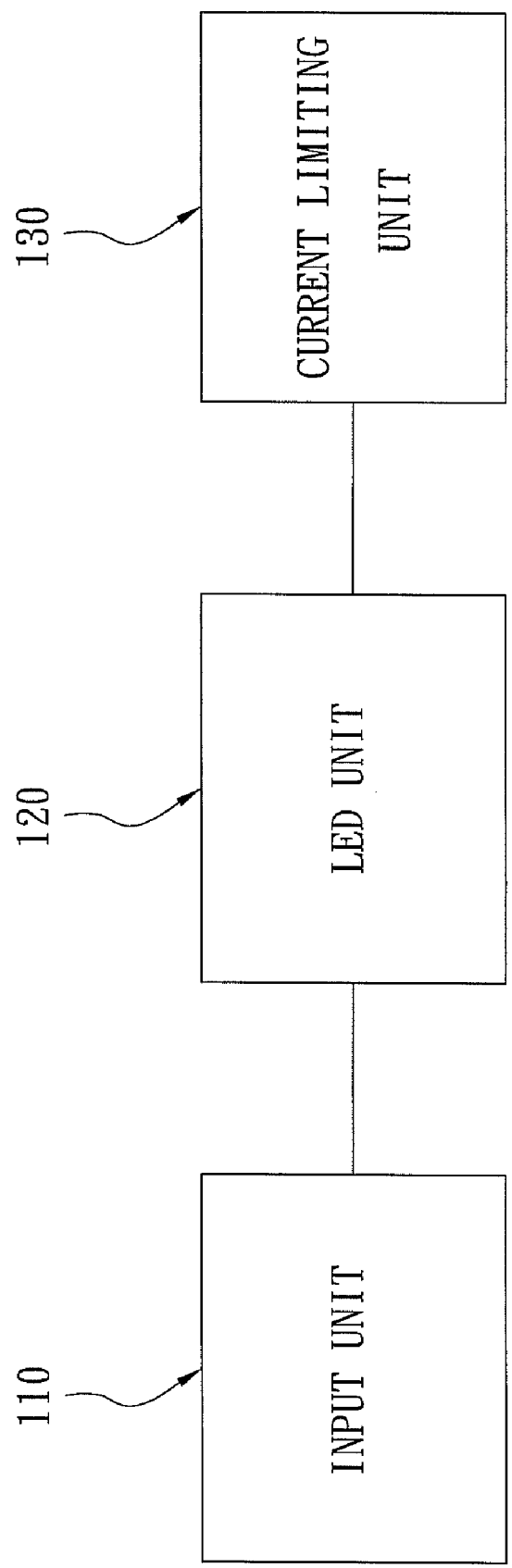
FIG. 1 is a block diagram of an embodiment of a circuit apparatus of an LED vehicle lamp in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
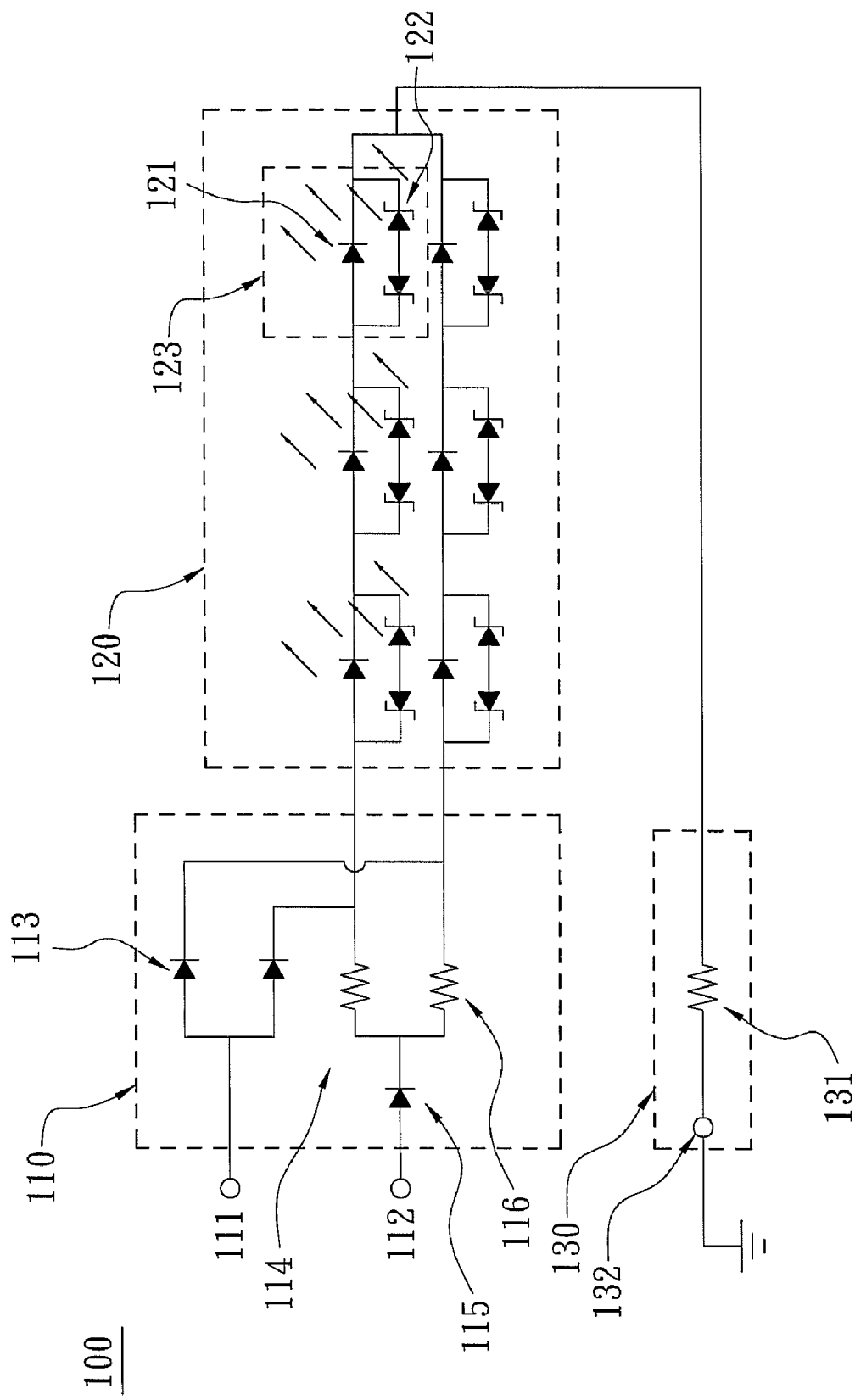
FIG. 2 is a circuit diagram of a circuit apparatus in FIG. 1.

Refer to FIG. 1 and FIG. 2. A circuit apparatus of an LED vehicle lamp 100 includes an input unit 110, an LED unit 120 and a current limiting unit 130.

In the present embodiment, the circuit apparatus of the LED vehicle lamp 100 is an exemplary embodiment of a vehicle tail lamp, and is explained below. The vehicle tail lamp is commonly divided into two operation modes: one is a taillight mode as receiving a tail light signal to light up, i.e. normal status, and the other is a braking mode as receiving a breaking signal to light up, i.e. when the driver steps on the brake. The brightness requirement for the braking mode is higher than the taillight mode. Therefore, in the present embodiment, the input unit 110 includes a first contact 111 for the braking signal to input, a second contact 112 for the tail light signal to input, a reverse bias protection device 113 and a current limiting device 114.

The first contact 111 receives the braking signal when the driver steps on the brake, and the second contact 112 receives a taillight signal when the driver turns on the tail light. The first contact 111 is electrically connected to the reverse bias protection device 113. In the present embodiment, the reverse bias protection device 113 includes two first reverse bias protection components. The first reverse bias protection components could be diodes and are connected in parallel. The second contact 112 is electrically connected to the current limiting device 114.

The required brightness of the LED unit 120 for the taillight mode is lower than the brightness for the braking mode. Therefore, in the present embodiment, the current limiting device 114 is used to limit the current, and includes a second reverse bias protection component 115 and two current limiting components 116. The second reverse bias protection component 115 is a diode. The current limiting components 116 are resistors, and are connected in parallel. The second reverse bias component 115 and the current limiting component 116 are connected in series.

The first contact 111 is connected to the anode of the diode of the reverse bias protection device 113. The second contact 112 is connected to anode of the diode of the second reverse bias protection component 115. The reverse bias protection device 113 is used to protect the LED unit 120 against reverse bias which can damage the LED unit 120. The current limiting device 114 decreases the current to flow into the LED unit 120, and hence the brightness of the LED unit 120 is reduced because of the reduction in current.

The LED unit 120 includes one or more light emitting devices 123. Each light-emitting device 123 includes one or more LEDs 121 and a protection device 122.

Figure 3:
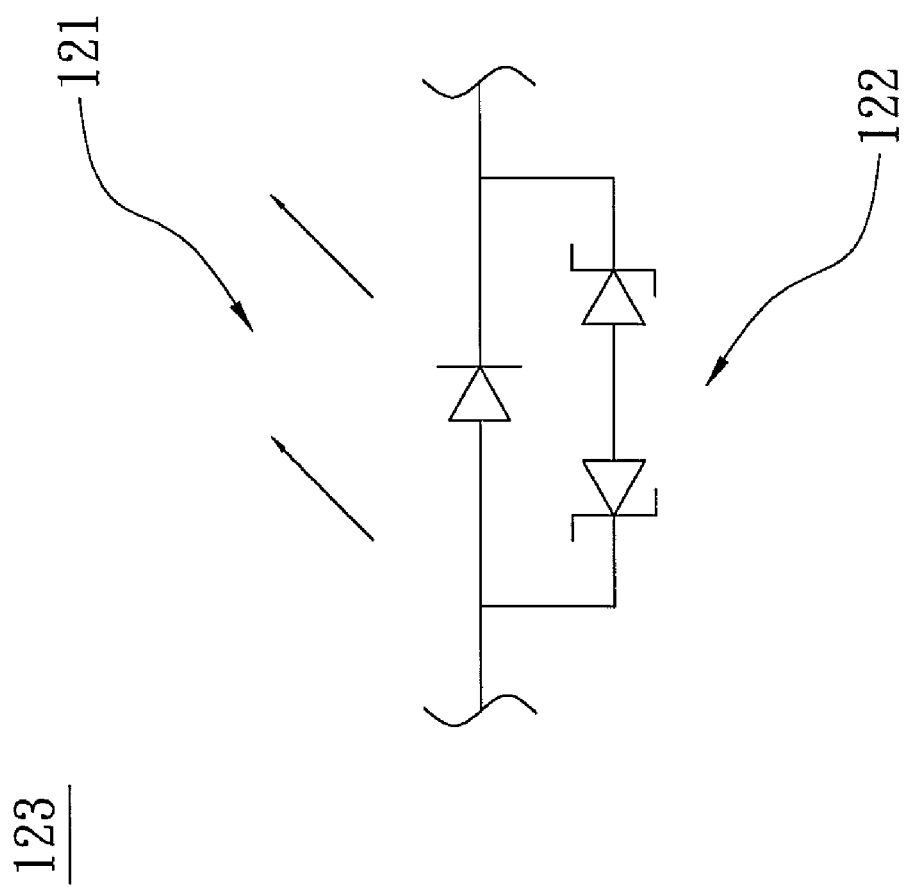
FIG. 3 is a circuit diagram of a light emitting device in FIG. 2.

Refer to FIG. 3. The protection device 122 is connected to the LED 121 in parallel, and has two electrostatic discharge (ESD) protection diodes connected back-to-back in series. The electrostatic discharge (ESD) protection diodes could be zener diodes or transient voltage suppressors (TVS). The LED 121 and the protection device 122 of the light-emitting device 123 are connected in parallel. The connection between the light emitting devices 123 could be in series, in parallel or in series-parallel to build up the LED unit of the present embodiment.

Refer to FIG. 2. The current limiting unit 130 includes a current limiter 131 and a reference signal terminal 132. The current limiting unit 130 limits the total current value of the circuit apparatus 100 and prevents the total current value from being too high and damaging the LED 121. In the present embodiment, the current limiter 131 is a resistor. One end of the current limiter 131 is connected to the LED unit 120. The other end of the current limiter 131 is connected to the reference signal terminal 132. The reference signal terminal 132 is a reference electrode potential connected to the ground, which is a reference of the first contact 111 and the second contact 112.

The protection device 122 prevents the brightness of a vehicle lamp from declining substantially caused by the broken LEDs to increase the traveling safety. Additionally, when the LEDs 121 are broken, it is easy to gauge which one is broken. Thus, the difficulty in repairing and maintaining is becoming easy and convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A circuit apparatus of an LED vehicle lamp, the circuit apparatus comprising:
an input unit;
an LED unit electrically connected to the input unit, and including at least one light emitting device, each light emitting device comprising:
at least one LED; and
a protection device electrically connected to each of the at least one LED in parallel; and
a current limiting unit electrically connected to the LED unit, wherein the input unit comprises a first contact for a braking signal to input and a reverse bias protection device electrically connected between the first contact and the LED unit, wherein the reverse bias protection device comprises two first reverse bias protection components connected to each other in parallel.

2. The circuit apparatus of an LED vehicle lamp of claim 1, wherein the first reverse bias protection components are diodes.

3. The circuit apparatus of an LED vehicle lamp of claim 1, wherein each of the at least one light emitting device is connected to the others in series-parallel combination in the circuit apparatus.

4. The circuit apparatus of an LED vehicle lamp of claim 1, wherein each of the at least one light emitting device is connected to the others in series.

5. The circuit apparatus of an LED vehicle lamp of claim 1, wherein each of the at least one light emitting device is connected to the others in parallel.

6. A circuit apparatus of an LED vehicle lamp, the circuit apparatus comprising:
an input unit;
an LED unit electrically connected to the input unit, and including at least one light emitting device, each light emitting device comprising:
at least one LED; and
a protection device electrically connected to each of the at least one LED in parallel; and
a current limiting unit electrically connected to the LED unit, wherein the input unit comprises:
a first contact for a braking signal to input;
a reverse bias protection device electrically connected between the first contact and the LED unit;
a second contact for a tail light signal to input; and
a current limiting device electrically connected between the second contact and the LED unit, wherein the current limiting device comprises a second reverse bias protection component and two current limiting components connected each other in parallel, and the second reverse bias component is connected to the current limiting components in series.

7. The circuit apparatus of an LED vehicle lamp of claim 6, wherein the second reverse bias protection component is a diode, and the current limiting components are resistors.

8. The circuit apparatus of an LED vehicle lamp of claim 7, wherein each light emitting device comprises one LED, and the protection device includes two electrostatic discharge diodes connected back-to-back in series and connected to the LED of the light emitting device in parallel.

9. The circuit apparatus of an LED vehicle lamp of claim 8, wherein each of the electrostatic discharge diodes of the protection device is a zener diode.

10. The circuit apparatus of an LED vehicle lamp of claim 8, wherein each of the electrostatic discharge diodes of the protection device is a transient voltage suppressor.

11. The circuit apparatus of an LED vehicle lamp of claim 7, wherein the current limiting unit comprises a current limiter, and the limiter is a resistor.

12. The circuit apparatus of an LED vehicle lamp of claim 6, wherein each of the at least one light emitting device is connected to the others in series-parallel combination in the circuit apparatus.

13. The circuit apparatus of an LED vehicle lamp of claim 6, wherein each of the at least one light emitting device is connected to the others in series.

14. The circuit apparatus of an LED vehicle lamp of claim 6, wherein each of the at least one light emitting device is connected to the others in parallel.

\* \* \* \* \*